Figure 1:
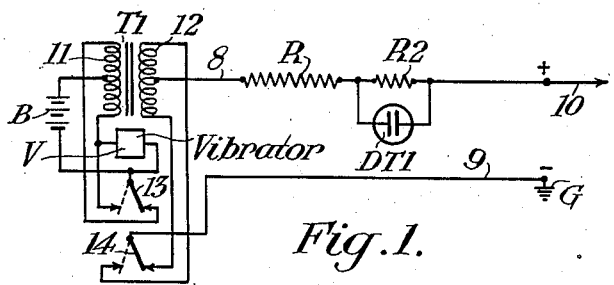

May 8, 1945. N. F. AGNEW ET AL 2,375,458
ELECTRICAL FENCE CHARGING APPARATUS
Original Filed Sept. 6, 1939

INVENTORS
Norman F. Agnew and
BY Willard P. Place.
Paul S. Johnson
THEIR ATTORNEY Patented May 8, 1945

2,375,458

UNITED STATES PATENT OFFICE 2,375,458

ELECTRICAL FENCE CHARGING APPARATUS

Norman F. Agnew and Willard P. Place, Wilkinsburg, Pa.

Original application September 6, 1939, Serial No. 293,582. Divided and this application March 17, 1943, Serial No. 479,418

8 Claims. (Cl. 256—10)

Our invention relates to electrical fence charging apparatus and more particularly to apparatus of this character which is capable of destroying vegetation growing in close proximity to an electrically charged conductor, for the purpose of avoiding the occurrence of undesired grounds on the conductor.

One important application of apparatus embodying our invention arises in connection with electrical fence charging installations wherein a suitable charge is impressed upon a stock-enclosing conductor or fence for the purpose of keeping farm stock from straying beyond the enclosure. In such installations, it is usual to impress the charging potential between one or more of the enclosing conductors and ground so that an animal coming in contact with the conductor will complete a discharge circuit to ground. Since the fence charging apparatus, to be safe, must incorporate certain current limiting features, it is apparent that the presence of an appreciable leakage current from the fence to ground such as may be caused by weed growths touching the charged conductor will impair the effectiveness of the stock enclosure. This problem is particularly acute in the case of an electric fence several miles long passing over uncultivated land or over moist ground where vegetation growth may be abundant. Difficulty is also encountered in the case of a low fence close to the ground, such as is required for herding small farm stock.

One object of apparatus embodying our invention is to render such an electric fence automatically self-cleaning with respect to vegetation coming in contact therewith, thus avoiding the necessity for frequent periodic inspection of the fence and manual cutting of the weed growth. Another object of the apparatus embodying our invention is to prevent the growth of vegetation over any desired area or along a right-of-way. A further object of our invention is to incorporate the weed-killing or self-cleaning features into the fence charging apparatus itself so that the one unit will serve both purposes. Another object of our invention is to provide an alarm suitable for detecting the presence of burglars or other unauthorized persons coming in contact with the charged conductor and thereby placing a partial short-circuit on the apparatus. Further objects and advantages will appear as the description progresses.

The present application is a division of our co-pending application Serial No. 293,582 filed on September 6, 1939, for Electrical fence charging apparatus.

We shall describe several forms of apparatus embodying our invention and shall then point out the novel features thereof in claims.

Figure 2:
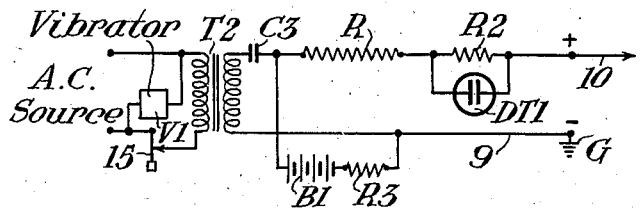
Figure 3:
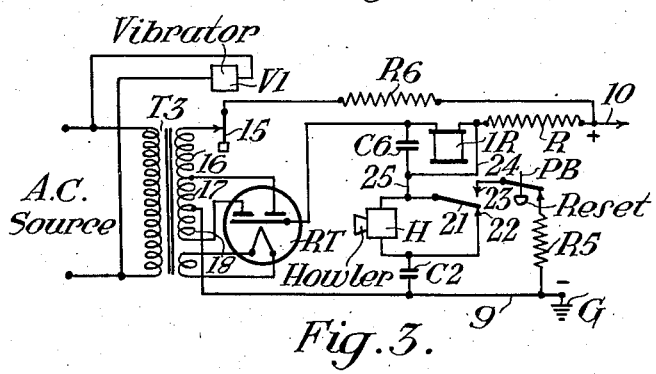
Figure 4:
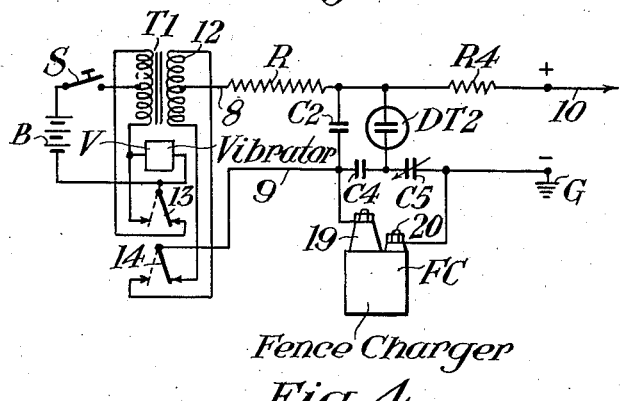
Figure 4A:
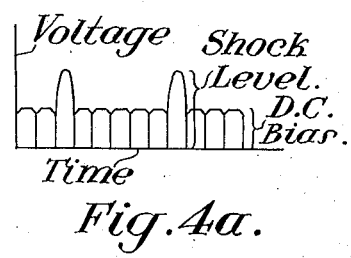

In the accompanying drawing, Fig. 1 is a diagrammatic view showing one form of apparatus for preventing short-circuits by vegetation embodying our invention. Figs. 2, 3, and 4 are diagrammatic views showing modified forms of the apparatus of Fig. 1, also embodying our invention. Fig. 3 shows, in addition, apparatus embodying our invention for providing an alarm when contact is established with the charged conductor. Figs. 1a to 4a, inclusive, show diagrammatically the form of the voltage or current output of the apparatus shown in Figs. 1 to 4, inclusive.

Similar reference characters refer to similar parts in each of the several views.

We have discovered in the course of practical operation of apparatus embodying our invention that within the range of voltages such as are safe for the purpose of fence charging, the polarity of the potential on the charged conductor plays an extremely important part in determining the effectiveness of the apparatus in keeping the fence clear of weeds. We have found, for example, that if the charged conductor is made positive, as indicated by a voltmeter or a milliammeter connected between the conductor and ground, then the apparatus is highly effective even at relatively low values of discharge current, and even if the potential is not applied constantly but is applied for periods of time at relatively infrequent intervals. On the other hand, if the charged conductor is made negative with respect to ground, or if the potential impressed thereon is alternating in character, then the effectiveness of the potential in destroying weeds is, for all practical purposes, negligible at values of steady current or impulse current such as can be considered safe for fence charging purposes. Accordingly, our invention includes as one of its important features the placing of a positive charge upon the conductor and supplying the conductor with a substantially unidirectional potential.

Referring now to Fig. 1, the apparatus of this figure is energized from a source of direct current B and a vibrator V having rectifying contacts is used for obtaining the necessary unidirectional potential for charging the enclosing conductor or fence 10. The primary winding 11 of the step-up transformer T1 has a mid-tap to which is connected one terminal of the battery B, the other terminal of the battery being connected alternately, first to one half, and then to the other half of winding 11, over the contact finger 13 of the vibrator V. This vibrator may be of any suitable and well-known design and as shown, is constantly energized from the battery B over an obvious circuit which includes the lower half of winding 11. In operation, the contact finger 13 alternately causes the flux in the core of the transformer T1 to reverse at a relatively rapid rate by virtue of the alternate energization in opposite directions of the two halves of the primary winding, thus causing an alternating output voltage of substantial magnitude to be induced in the secondary winding 12.

The output from the transformer T1 is rectified over a second contact finger 14 of the vibrator and is impressed across the conductors 8 and 9. The polarity is so selected that the charge on wire 8 is positive with respect to wire 9 which is connected to ground at G. Wire 8 is connected with the charged conductor 10 through a protective resistor R and also through a second resistor R2 around which is connected the discharge tube DT1. The resistor R2 has a relatively low ohmic value as compared with resistor R, its resistance being sufficient merely to provide a potential drop adequate to cause the tube DT1 to glow in the event that conductor 10 becomes grounded. By connecting the tube DT1 around resistor R2 rather than around the protective resistor R, an accidental short-circuit in the tube will not short-circuit the protective resistor, thus adding to the safety of the circuit.

The transformer T1 may have high leakage reactance, if desired, thus aiding the resistor R in limiting the maximum current output of the apparatus. Since the vibrator V is well known, the structure of this vibrator has not been shown in detail. It will be understood that as long as the battery is connected across the vibrator, the contact fingers 13 and 14 will continue to operate, alternately closing the right-hand and left-hand contacts of the vibrator. As shown, the vibrator is connected to the battery B over one-half of the winding 11 of transformer T1, but this connection is not essential and the vibrator may be connected directly across the battery, if preferred.

Figure 1A:
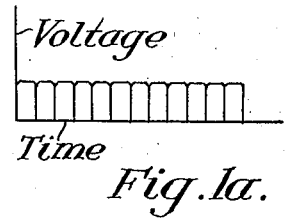

The output of the apparatus of Fig. 1 is indicated diagrammatically in the voltage or current curve of Fig. 1a which is somewhat square-topped in form.

Referring to Fig. 2, the apparatus of this figure provides a generally unidirectional output as in Fig. 1, which is periodically interrupted by a suitable vibrator or chopper device V1 having a contact in the input circuit of the step-up transformer T2. The rate at which the contact 15 periodically opens and closes may be of the order of 40 to 60 times per minute and the "on" period or length of time during which this contact remains closed in each cycle may be adjusted to as short a time as is necessary to administer the desired shock. The periodic operation of the chopper V1 serves to conserve power during the "off" intervals and also aids disengagement of the stock coming in contact with the charged conductor. In this figure, an independent source of direct current B1 is used for superimposing a unidirectional component on the alternating current shock impulses. The transformer T2 supplies the shock potential through the resistors R and R2. The condenser C3 prevents the output winding of the transformer T2 from short-circuiting the battery B1 but permits the alternating current output to pass freely therethrough.

The resistor R3 provides a means of adjusting the current flow from the battery B1.

Figure 2A:
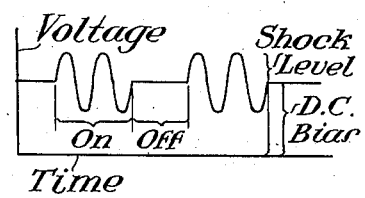

Fig. 2a shows in an approximate manner the nature of the voltage or current output delivered to the charged conductor by the apparatus of Fig. 2. The charge on the conductor is seen to alternate between a relatively high and a relatively low positive value, with the direct current bias effective between shock impulses.

Referring now to Fig. 3, this figure combines the apparatus of Fig. 1 which provides the unidirectional bias for weed destruction, with that portion of the apparatus of Fig. 2 which provides an alternating current shock, and incorporates alarm apparatus which provides a warning when contact is established with the charged conductor. Since it is desirable to maintain the unidirectional bias effective for appreciable periods of time without interruption, the vibrator contact 15 is connected in the output rather than the input circuit of the transformer T3. In this manner, the shock potential which is impressed between conductor 10 and ground by windings 16 and 17 is intermittent in character, whereas the unidirectional bias which is impressed alternately by windings 17 and 18, through the rectifying tube RT, is substantially constant. The resistor R6 limits the current in the shock circuit to a safe value, whereas the resistor R performs a similar function in the circuit which supplies the bias potential.

The circuit of Fig. 3 is useful not only for keeping a charged enclosure free of grounds due to vegetation, but also provides a useful circuit for guarding an enclosure against entry by burglars or other unauthorized persons. In order to provide an indication or alarm of contact with the charged conductor by such persons, we have provided novel alarm apparatus which includes a normally deenergized indication relay IR which controls a horn or "howler" H and which, in turn, is controlled by a reset push button PB. The relay IR is so designed as to pick up on the current from the tube RT flowing through the charged conductor 10 when contact is established between this conductor and ground through the body of a person or otherwise.

The "howler" H is normally short-circuited over the back contact 21—22 of the relay IR and so is normally inoperative. When relay IR picks up, opening contact 21—22, energy from the tube RT will flow through the condensers C6 and C2, thus energizing the "howler" to provide the desired indication of contact with the charged conductor. Once relay IR picks up, a holding circuit for this relay becomes effective by virtue of the partial short-circuit which is established across the line through wires 24 and 25, front contact 21—23 of relay IR, reset button PB, and grounding resistor R5. Accordingly, relay IR will remain energized and the alarm will continue until such time as operation of the push button PB opens the holding circuit and restores the alarm apparatus to its normal inactive condition.

The purpose of condenser C2 is to improve the output of the rectifying tube. The condenser C6 permits the pulsating current in the output of the rectifying tube to be by-passed to the charged conductor 10 around the inductance due to the winding of relay IR which would otherwise impede the flow of this current. Condenser C6 also completes the circuit to the "howler" H when contact 21—22 of relay IR is open.

The alarm apparatus shown in Fig. 3 may be incorporated into any of the other figures of the drawing when it is desired to use the apparatus of these figures for protective purposes to prevent entry of a building or enclosure by unauthorized persons.

Figure 3A:
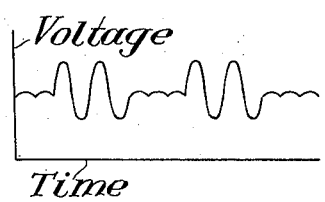

The voltage or current which is effective in the output circuit of Fig. 3 is shown diagrammatically in Fig. 3a.

Referring now to Figure 4, this figure shows one manner in which the weed-destroying apparatus embodying our invention may be combined with a fence charger unit to provide the advantages of the apparatus shown in the previous figures, without the necessity for altering the fence charger unit itself or its internal connections in any way. The unit FC may be any suitable type of fence charger which delivers an alternating or a direct current output, either steadily or in impulse form, for charging the usual electric fence or conductor. The basic circuit which we have chosen for obtaining cooperation with the unit FC is the circuit of Fig. 1, modified slightly to adapt the apparatus for operation in conjunction with the charger unit.

The output from the transformer T1, as rectified by the vibrator V, is impressed across the wires 8 and 9, as in Fig. 1, and is conducted to wire 10, on the one hand, over the resistors R and R4, and to ground, on the other hand, through the high tension terminal 19 of the fence charger, the internal connections of the charger, and the ground terminal 20. One path for the output from the fence charger FC is from terminal 19, through wire 9, contact finger 14 of the vibrator V, one or the other half of the output winding 12 of transformer T1, and wire 8, to the conductor 10. Since this output will usually be alternating or pulsating in character, it will also flow freely through the main path provided therefor which includes condenser C2, resistor R4, and conductor 10. The condensers C4 and C5 are used for the purpose of completing a bridge circuit together with the condenser C2 and a phantom condenser (not shown) which results from the inherent electrostatic capacity of the fence wire 10 to ground. This capacity bridge is normally balanced so that the tube DT2 which is connected across the arms of the bridge is inactive, but lights up when the bridge is unbalanced due to a ground on wire 10 which tends to short-circuit the phantom condenser. Resistor R is the protective resistor, as in the remaining figures, and resistor R4 is provided for the purpose of limiting the discharge current from condenser C2 when contact is established with the charged conductor. The value of resistor R4 is comparatively low and may be neglected in considering the condenser bridge circuit. The condenser C5 is made variable in order that the bridge may be balanced for different values of the capacity of wire 10 to ground, as may be required by individual installations.

Since it is only necessary to have the unidirectional potential applied at infrequent intervals for the purpose of destroying weeds coming in contact with the conductor 10, we have provided the switch S which normally disconnects the battery B from the circuit. The discharge tube DT2 is provided for the purpose of indicating when the weed growth, as indicated by a predetermined decrease in the resistance of conductor 10 to ground is sufficient to render it necessary to close the switch S and apply the unidirectional potential. As long as the resistance of conductor 10 to ground is above the predetermined value, the condenser bridge will not be unbalanced sufficiently to cause the discharge tube DT2 to glow. When, however, the resistance of wire 10 to ground falls below the predetermined value, the effect of the capacity to ground will be reduced sufficiently to cause the tube to glow and thereby to indicate the necessity for closing the weed-destroying circuit. As soon as the vegetation growth has been destroyed to cause the insulation resistance of conductor 10 to be restored to the desired value, as determined by the cut-off potential of the tube DT2, this tube will cease to glow, thus indicating that switch S may again be opened.

As pointed out hereinbefore, the fence charger unit FC may be of any suitable type and may deliver either an alternating or a direct current output, either steady or intermittent in character. If the output from the unit FC is alternating, it has been our experience that the weeds will not be effectively destroyed. The same is also true if the output is direct current but the charged conductor or fence is made negative with respect to ground. Moreover, even if the charged conductor is made positive, but if the potential is not properly chosen or is not applied for a prolonged time but is applied in intermittent impulse form, then it has been our experience that effective weed destruction will not be obtained. In view of the foregoing consideration, the advantages of the apparatus shown in Fig. 4 as well as of the remaining figures will become readily apparent.

The condensers C2, C4, and C5 of Fig. 4 may have values of the order of 0.25, 0.1, and 0.01 microfarad, respectively. In Figs. 2, 3, and 4 in which a separate unidirectional potential is introduced for weed-destroying purposes, the value of this potential may be of the order of three or four hundred volts, and we have found it ordinarily sufficient if this potential is maintained applied for a period of one or two days at a time. The actual potential appears less important than the current which should be of the order of one to five milliamperes for effective weed destruction. If the unidirectional potential is used for both weed destruction and stock control or for other protective purposes as in Fig. 1, then the latter considerations determine the value of the potential and the potential in these figure is, as a matter of course, sufficient for weed destruction. If the fence charger FC in Fig. 4 is of a type which is designed to deliver unidirectional impulses of negative polarity with respect to ground, then the charger should be so connected into the circuit that its positive terminal is connected with wire 9 and its negative terminal is connected with ground.

It will be understood that the various values recited above are merely illustrative of one particular set of apparatus operating to provide the advantages embodied in our invention but our invention is obviously not limited to these values which are recited for the sole purpose of providing a more clear understanding of the invention. We have found that these values may be widely departed from without a substantial sacrifice of the advantages embodied in our apparatus. The apparatus can, of course, be used solely for weed destruction, if desired, without the shock apparatus which is provided for stock herding or other protective purposes.

If the fence charger FC is assumed to deliver alternating current impulses, then the charge on the conductor 10 which is impressed by the apparatus of Fig. 4 is somewhat similar to that shown diagrammatically in Fig. 3a. If the charger delivers unidirectional current impulses, then the resultant output will have a wave form similar to that indicated in the curve of Fig. 4a.

It will be understood that the apparatus of each of the Figs. 1 to 4, inclusive, may be used not only for weed destruction but also for the protection of property to prevent entry by unauthorized persons into a yard, building, or other protected area. When so used, the alarm apparatus of Fig. 3 may be adapted in an obvious manner to provide an alarm in the event that contact is established with the charged conductor.

It will be apparent from the foregoing description that we have provided electrical fence charging apparatus for preventing short-circuits by vegetation and preventing unauthorized entry or escape from an enclosure which is highly effective yet simple, reliable, and safe in its operation. When used as a fence charger for herding farm stock, the apparatus provides a combination which is comparatively free from the trouble and annoyance caused by grounds on the charged conductor.

Although we have herein shown and described only a few forms of apparatus embodying our invention, it is understood that various changes and modifications may be made therein within the scope of the appended claims without departing from the spirit and scope of our invention.

Having thus described our invention, what we claim is:

1. Apparatus for electric fence charging and for preventing short-circuits on the fence conductor by vegetation coming in contact therewith comprising, in combination, a source of alternating current, a transformer having its input winding energized from said source, means for impressing the output from said transformer across said conductor and ground for providing a shock potential on said conductor, and means including a source of unidirectional current for impressing a unidirectional potential across said conductor and ground in a direction to render said conductor positive with respect to ground, said unidirectional potential augmenting said shock potential and providing a bias voltage effective for destroying said vegetation.

2. Apparatus for electric fence charging and for preventing short-circuits on the fence conductor by vegetation coming in contact therewith comprising, in combination, a source of alternating current, a transformer having its input winding energized from said source, means including a condenser for impressing the output from said transformer across said conductor and ground for providing a shock potential on said conductor, and a source of direct current connected across said conductor and ground in a direction to render said conductor positive with respect to ground, the potential of said direct current source acting to augment said shock potential and to provide a bias voltage effective for destroying said vegetation, said condenser acting to prevent short-circuiting of said direct current source by the output winding of said transformer.

3. Apparatus for electric fence charging and for preventing short-circuits on the fence conductor by vegetation coming in contact therewith comprising, in combination, a source of direct current, a transformer, a vibrator, means including said vibrator for periodically energizing the input winding of said transformer with current from said source and for rectifying the alternating current induced thereby in the output winding of said transformer, means for impressing the rectified output from said transformer across said conductor and ground in a direction to render said conductor positive with respect to ground, and a source of shock-potential included in the circuit of said conductor and ground in a direction to aid said rectified output.

4. Apparatus for electric fence charging and for preventing short-circuits on the fence conductor by vegetation coming in contact therewith comprising, in combination, a source of direct current, a transformer, a vibrator, means including said vibrator for periodically energizing the input winding of said transformer with current from said source and for rectifying the alternating current induced thereby in the output winding of said transformer, means for impressing the rectified output from said transformer across said conductor and ground, and a source of shock potential included in the circuit of said conductor and ground so as to superimpose said shock potential upon said rectified output.

5. Apparatus for electric fence charging and for preventing short-circuits on the fence conductor by vegetation coming in contact therewith comprising, in combination with said conductor, a source of direct current, a transformer, a vibrator, means including said vibrator for periodically energizing the input winding of said transformer with current from said source and for rectifying the alternating current induced thereby in the output winding of said transformer, means for impressing the rectified output from said transformer across said conductor and ground in a direction to render said conductor positive with respect to ground, a source of shock potential included in the circuit of said conductor and ground so as to superimpose said shock potential upon said rectified output, a normally balanced capacity bridge including in one of its arms the distributed electrostatic capacity of said conductor to ground, and an indicator controlled by said bridge and effective for providing an indication when said bridge becomes unbalanced due to the occurrence of a ground on said conductor.

6. Apparatus for electric fence charging and for preventing short-circuits on said fence by vegetation coming in contact therewith comprising, in combination, means including a first source of current for impressing a shock potential between said fence and ground, and means including a separated effective second source of current for substantially constantly impressing a unidirectional potential between said fence and ground in a direction to render the fence positive with respect to ground, said unidirectional potential augmenting said shock potential and providing a bias voltage effective for destroying said vegetation.

7. Apparatus for electric fence charging and for preventing short-circuits on said fence by vegetation coming in contact therewith comprising, in combination, means including a first source of current for periodically impressing a shock potential between said fence and ground, and means including a separately effective second source of current for substantially constantly impressing a unidirectional potential between said fence and ground in a direction to render the fence positive with respect to ground, said unidirectional potential providing a bias voltage effective for destroying said vegetation.

8. Apparatus for electric fence charging and for preventing short-circuits on said fence by vegetation coming in contact therewith comprising, in combination, means including a first source of current for impressing a shock potential between said fence and ground, and means including a separately effective source of current for substantially constantly impressing a unidirectional potential between said fence and ground in a direction to render the fence positive with respect to ground, said unidirectional potential providing a bias voltage effective for destroying said vegetation.

NORMAN F. AGNEW.
WILLARD P. PLACE.